US008438410B2

(12) United States Patent  (10) Patent No.: US 8,438,410 B2
David et al.  (45) Date of Patent: May 7, 2013

(54) MEMORY POWER MANAGEMENT VIA DYNAMIC MEMORY OPERATION STATES

(75) Inventors: Howard S. David, Portland, OR (US); Ulf R. Hanebutte, Gig Harbor, WA (US); Eugene Gorbatov, Hillsboro, OR (US); James W. Alexander, Hillsboro, OR (US); Suneeta Sah, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 253 days.

(21) Appl. No.: 12/821,867

(22) Filed: Jun. 23, 2010

(65) Prior Publication Data

US 2011/0320839 A1  Dec. 29, 2011

(51) Int. Cl.
G06F 1/26 (2006.01)
G06F 13/00 (2006.01)

(52) U.S. Cl.
USPC ............................ 713/322; 713/323; 710/104

(58) Field of Classification Search .................... 713/322
See application file for complete search history.

(56) References Cited

U.S. PATENT DOCUMENTS

| | | | |
|---|---|---|---|
| 6,112,310 A | 8/2000 | Jun et al. | |
| 6,263,448 B1 | 7/2001 | Tsern et al. | |
| 6,820,209 B1 * | 11/2004 | Culbert et al. | 713/501 |
| 7,051,221 B2 * | 5/2006 | Clabes et al. | 713/320 |
| 7,689,847 B2 * | 3/2010 | Chang et al. | 713/322 |
| 7,783,905 B2 * | 8/2010 | Chang et al. | 713/320 |
| 7,797,563 B1 * | 9/2010 | Moll et al. | 713/324 |
| 8,015,423 B1 * | 9/2011 | Satterfield et al. | 713/322 |
| 8,156,287 B2 * | 4/2012 | Bose et al. | 711/137 |
| 8,190,930 B2 * | 5/2012 | Herdrich et al. | 713/300 |
| 8,341,637 B2 * | 12/2012 | Corry et al. | 718/104 |
| 2004/0148528 A1 * | 7/2004 | Silvester | 713/300 |
| 2004/0215988 A1 * | 10/2004 | Clabes et al. | 713/300 |
| 2006/0031692 A1 * | 2/2006 | Kato et al. | 713/300 |
| 2006/0123253 A1 * | 6/2006 | Morgan et al. | 713/300 |
| 2006/0174151 A1 * | 8/2006 | Lin et al. | 713/500 |
| 2006/0174228 A1 | 8/2006 | Radhakrishnan et al. | |
| 2007/0288769 A1 * | 12/2007 | Chang et al. | 713/300 |
| 2007/0288782 A1 * | 12/2007 | Chang et al. | 713/323 |
| 2008/0183903 A1 | 7/2008 | Vanstee et al. | |
| 2008/0215903 A1 | 9/2008 | Payne | |
| 2008/0320267 A1 * | 12/2008 | Bilger et al. | 711/170 |
| 2008/0320323 A1 * | 12/2008 | Brittain et al. | 713/340 |
| 2009/0007128 A1 * | 1/2009 | Borghetti et al. | 718/104 |
| 2009/0070605 A1 | 3/2009 | Nijhawan et al. | |

(Continued)

FOREIGN PATENT DOCUMENTS

GB  2432695  5/2007
WO  WO-2009125789  10/2009

OTHER PUBLICATIONS

Combined Search and Examination Report for GB Patent Application No. GB1109041.2 mailed Sep. 29, 2011, 13 pgs.

(Continued)

Primary Examiner — Ryan Stiglic
(74) Attorney, Agent, or Firm — Blakely, Sokoloff, Taylor & Zafman LLP

(57) ABSTRACT

Described herein are techniques for dynamic memory frequency/voltage scaling to augment existing memory power management techniques and further improve memory power efficiency. Each operating point is defined as an operational state for the memory.

26 Claims, 4 Drawing Sheets

U.S. PATENT DOCUMENTS

2009/0119471 A1  5/2009  Hur et al.
2010/0180081 A1* 7/2010  Bose et al. .................. 711/122
2010/0218005 A1* 8/2010  Jain et al. .................... 713/300
2010/0250981 A1* 9/2010  Pamley et al. ............... 713/320
2010/0257379 A1* 10/2010 Wang et al. .................. 713/300
2010/0332876 A1* 12/2010 Fields et al. ................. 713/323
2011/0022876 A1  1/2011  Sasaki
2011/0320846 A1* 12/2011 David et al. ................. 713/340

OTHER PUBLICATIONS

Notice of Preliminary Rejection for Korean Patent Application No. 10-2011-60664 mailed Oct. 26, 2012, 5 pgs.

Examination Report for GB Patent Application No. GB1109041.2 mailed Oct. 4, 2012, 2 pgs.

* cited by examiner

| | FREQUENCY | RANK IDLE | RANK0/RANK1 POWERDOWN |
|---|---|---|---|
| H0 | 1600 | 80 (conservative) | Fast/Fast |
| H1 | 1600 | 40 | Fast/Slow |
| H2 | 1066 | 18 | Fast/Slow |
| H3 | 1066 | 18 (aggressive) | Fast/Slow -> Slow/Slow (Idle Channel) |

← Higher Performance

Lower Performance →

FIG. 1

MEMORY POWER MANAGEMENT VIA DYNAMIC MEMORY OPERATION STATES

RELATED APPLICATIONS

This U.S. patent application is related to co-pending U.S. patent application Ser. No. 12/821,874, entitled "ADAPTIVE MEMORY FREQUENCY SCALING," which was filed concurrently herewith.

TECHNICAL FIELD

Embodiments of the invention relate to operational management of electronic devices. More particularly, embodiments of the invention relate to techniques for adaptively adjusting operational states of electronic devices.

BACKGROUND

Enterprise server systems as well as other electronic systems have seen an increased focus on energy efficiency and energy proportional computing in the last several years. Managing memory power is critical to the overall efficiency in these platforms given capacity and bandwidth requirements of server processors and workloads.

As the number of processing cores continues to increase and integration of throughput computing and input/output (I/O) capabilities accelerates this trend is expected to intensify making memory power management a key element of platform energy efficiency. One approach is to focus on reducing idle memory power through aggressive support of power-down and self-refresh states leading to significant improvements in memory power efficiency.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 1 is an example memory power/performance table for an embodiment having four memory power states and two memory modules.

DETAILED DESCRIPTION

Figure 2:
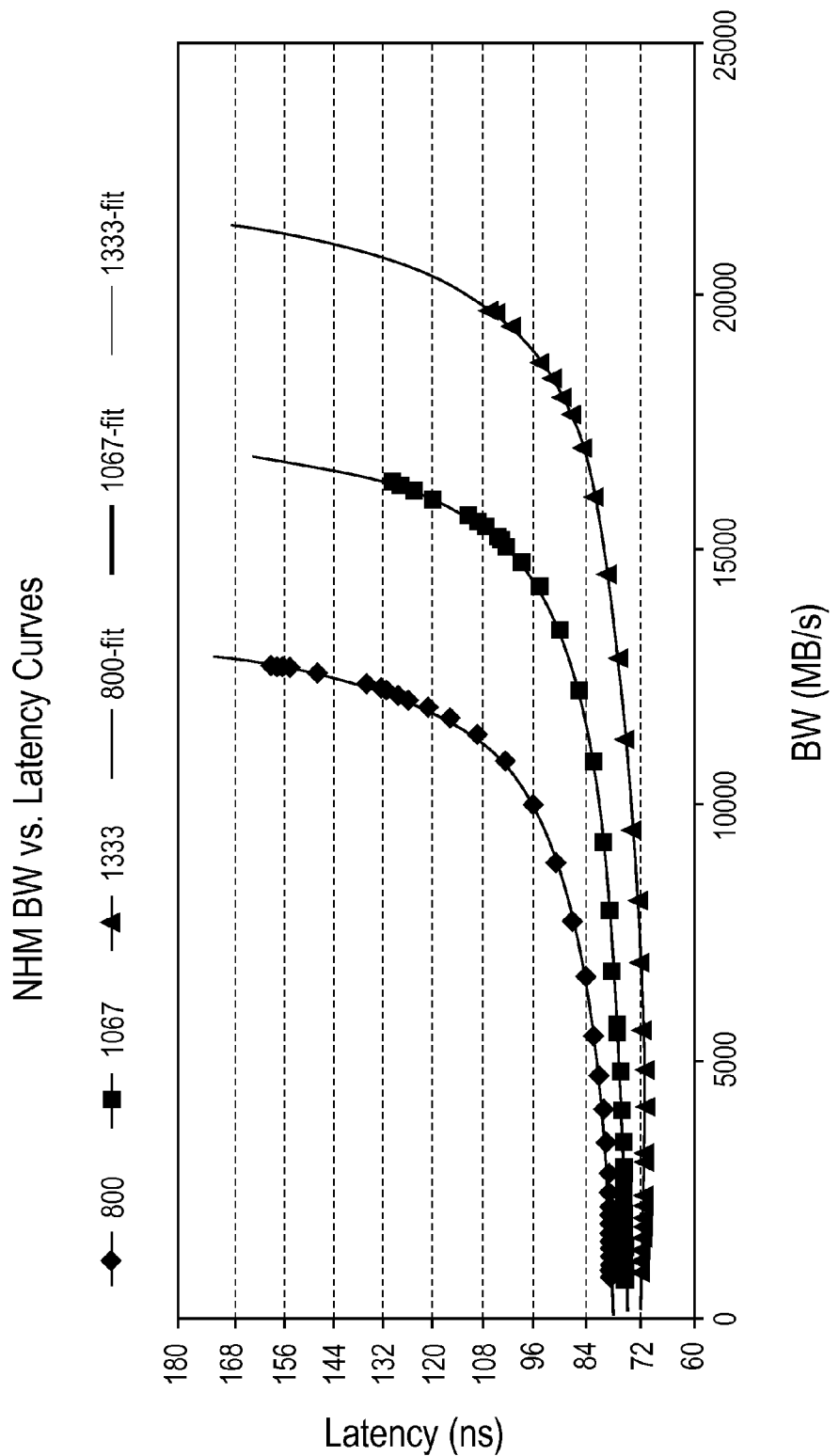
FIG. 2 provides example bandwidth vs. latency curves for an example memory sub-system operating at 800 MHz, 1066 MHz and 1333 MHz.

In the following description, numerous specific details are set forth. However, embodiments of the invention may be practiced without these specific details. In other instances, well-known circuits, structures and techniques have not been shown in detail in order not to obscure the understanding of this description.

Described herein are techniques for dynamic memory frequency/voltage scaling to augment existing power states and further improve memory power efficiency. Each frequency/voltage operating point is defined as H-state similar to processor P-states. In one embodiment, H-state control policies are implemented in hardware. Described herein are techniques to obtain, within the memory controller, a memory scaling factor that dynamically captures workload sensitivity to memory latency and guides H-state transition decisions.

In one embodiment, workloads that can tolerate higher memory latency run at lower frequency improving platform energy efficiency while workloads that are sensitive to memory latency run at higher speeds taking full advantage of performance capabilities available in the platform. Within the memory controller, a process may be periodically scheduled to access the memory operating condition and to select the appropriate H-state for the next time interval. This process might be executed, for example, at 1 ms granularity.

The concept of H-states can be applied beyond frequency/voltage, for example, by defining H-states with different prefetch policies, powerdown policies and powerdown depth. In alternate embodiments, a technique may be provided for an operating system interaction to support a "hardware managed/operating system guided" power management paradigm.

The techniques described herein may be considered as defining specific memory operation states (H-states), selection of the best operation state for the next time interval given a set of observations, and to reconfiguration of the memory parameters according to the new operation state. Furthermore, an interface may be provided for interaction with the operating system to obtain policy information and to provide Quality of Service (QoS) feedback. The memory management/configuration process (observing, selecting, reconfigure) might be performed at a time cadence of, for example, 1 ms or at a different cadence (higher or lower) dependent on specific requirements.

FIG. 1 is an example memory power/performance table for an embodiment having four memory power states and two memory modules. An example of H-state definitions is given for two Dual In-line Memory Modules (DIMMs) per channel (e.g., DDR3) is given in FIG. 1. The specific set of H-states, not limited to four as in this example and their specific configurations will be platform dependent and may be determined through, for example, optimization studies during the architecture design phase.

The technique described with respect to FIG. 1 provides an approach for determining workload memory scalability, called Memory Scaling Factor (MSF), that can be used to control memory frequency and voltage scaling. The two performance characteristics of a memory sub-system are its bandwidth capability and latency. For closed page operation without any powerdown, the relationship between bandwidth and latency is very well described by the queuing equation:

$$\text{Latency} = \text{IdleLatency} + \text{slope} * \frac{\text{Bandwidth}}{\text{PeakSustainedBandwidth} - \text{Bandwidth}}$$

Where IdleLatency represents the latency observed on an idle memory subsystem, Bandwidth represents the current memory bandwidth usage, and PeakSustainedBandwidth represents a highest sustainable bandwidth for the memory device. As long as the memory sub-system is capable of delivering the bandwidth required by the application, the critical performance factor is the latency.

FIG. 2 provides example bandwidth vs. latency curves for an example memory sub-system operating at 800 MHz, 1066 MHz and 1333 MHz. In the example of FIG. 2, the memory running at 1333 MHz has lower latency than at 1066 MHz, which has lower latency than at 800 MHz.

In one embodiment, latency as function of bandwidth is calculated for each of the frequencies at which the memory may operate and the result is stored for later use. As the memory latency increases, the processor core's clocks per instruction (CPI) increases. CPI is related to memory latency by:

$$CPI = CPI_{core} + MPI * BlockingFactor * MemoryLatency$$

where MPI represents misses per instruction and Blocking-Factor is a number between 0 and 1 corresponding to the percentage of misses that stall the processor core.

A Memory Scaling Factor (MSF) may be utilized for memory operation state selection purposes. MPF may be defined as:

$$MSF = \frac{\% \Delta CPI}{\% \Delta MemoryLatency}$$

or as:

$$MSF = \frac{(CPI_N - CPI_{MaxFreq}) / CPI_{MaxFreq}}{(Latency_N - Latency_{MaxFreq}) / Latency_{MaxFreq}}$$

A small MSF value implies a high $CPI_{core}$, low MPI and/or low blocking factor, and an application that is relatively insensitive to memory latency. A high MSF implies low $CPI_{core}$, high MPI and/or high blocking factor, and an application that is sensitive to memory latency.

The MSF can be determined in different ways. In one embodiment, MSF is determined in real time (or near real time) via a small perturbation of the memory timing parameter in the latency path. In one embodiment, this may be accomplished by toggling the value of tRCD up and down by 2 clock cycles every 10 ms. For example, if the tRCD of the DIMM is specified at 9 clock cycles, the tRCD may be varied between 8 and 10 clock cycles. This periodic variation in the memory latency provides a signal in the thread's CPI. In one embodiment, by utilizing filtering and weighted rolling averaging, it is possible to extract an MSF.

In one embodiment, the "read round trip delay" may be toggled up and down by, for example, one or two clock cycles. This may be effective for both "memory closed page" and "memory open page" policies. In another embodiment, where a "core memory stall counter" divided by a "core running clocks counter" the MSF may be determined directly for a core. This last embodiment does not require toggling of a timing parameter.

In various embodiments, formulas, for the Nth sample, and threads 0 to M, are:

$$MSF_N = \frac{CPI\_high\_tRCD_{N-1} - average(CPI\_low\_tRCD_{N-2}, CPI\_low\_tRCD_N)}{(2\ clock * 1.5\ ns/clock) / MeasuredLatency}$$

where the term "1.5 ns" is dependent on the clock frequency and may be changed for different frequencies. Another formula that may be utilized is:

$$MSF_{max_N} = \max(MSFthread_{N,thread_0} * Util_{N,thread_0}, \ldots, MSFthread_{N,thread_M} * Util_{N,thread_M})$$

where MSFthread indicates the MSF for a particular thread and Util indicates memory utilization by the thread.

The performance impact of running at different memory frequencies can be summarized by:

$$\% CPI\_impact = MSF * \% Latency\_impact$$

where % Latency_impact represents the percentage increase in CPI caused by running at a lower frequency or H-state. % Latency_impact is the percentage increase in memory read latency caused by running at a lower frequency or H-state.

In one embodiment a Maximum Performance Hit (MPH) parameter is selected that may be utilized to select the memory operating frequency that meets the selected MPH. In one embodiment that utilizes the 800 MHz, 1066 MHz and 1333 MHz memory devices, the latency impacts may be determined as:

% Latency_impact_1066=Latency_1066/Latency_1333

% Latency_impact_800=Latency_800/Latency_1333 from the latencies corresponding to the observed bandwidth as stored in the manner described above.

In one embodiment, the memory controller (or other system component) may select the lowest H-state that satisfies:

% CPI_impact≤MPH

Previously, for active memory, only a single memory state is supported. That is, at boot time the BIOS code sets all memory parameters to a fixed value according to selected BIOS options. Thus, in these previous memory sub-systems, memory frequency and voltage, powerdown states and policies and prefetch policies are static. Generally, memory is configured to provide highest performance regardless of energy costs. Utilizing the techniques and mechanisms described herein, memory operation can be dynamically customized to provide reduced energy consumption without excessive performance penalties that would be required by a static configuration targeting power savings.

Returning to FIG. 1, the parameters described above can be utilized to select an operational state (H-state) for the memory system. The parameters of FIG. 1 illustrate four example operational states (H0, H1, H2 and H3) 110 that provide different combinations of operating frequency 120, rank idle time values 130, and rank powerdown policies 140. The upper table rows (lower numerical H-state values) provide higher memory system performance while the lower table rows (higher numerical H-state values) provide lower memory system performance.

Figure 3:
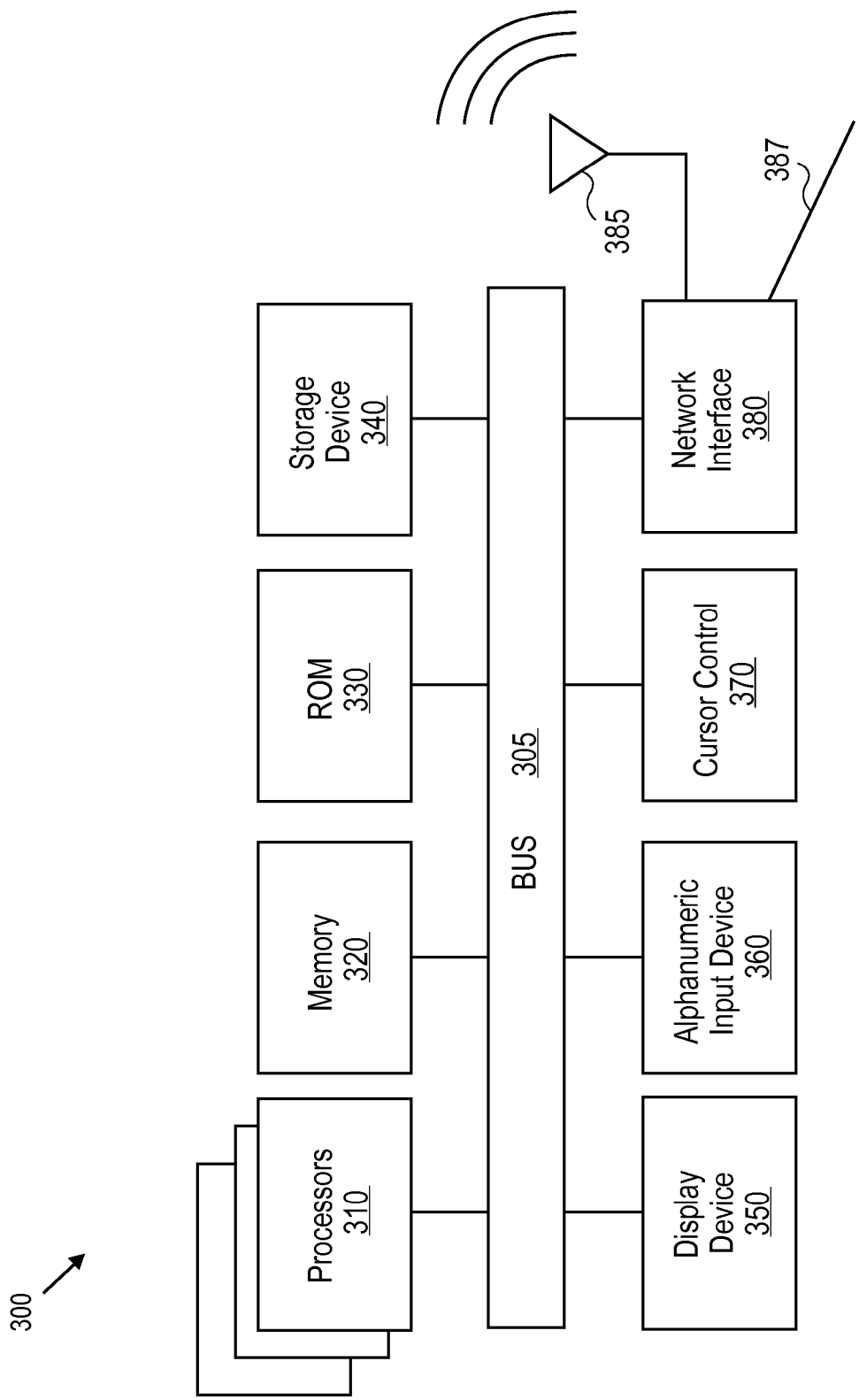
FIG. 3 is a block diagram of one embodiment of an electronic system.

FIG. 3 is a block diagram of one embodiment of an electronic system. The electronic system illustrated in FIG. 3 is intended to represent a range of electronic systems (either wired or wireless) including, for example, servers, desktop computer systems, laptop computer systems, cellular telephones, personal digital assistants (PDAs) including cellular-enabled PDAs, set top boxes. Alternative electronic systems may include more, fewer and/or different components.

Electronic system 300 includes bus 305 or other communication device to communicate information, and processor 310 coupled to bus 305 that may process information. While electronic system 300 is illustrated with a single processor, electronic system 300 may include multiple processors and/or co-processors and/or multiple processing cores.

Electronic system 300 further may include random access memory (RAM) or other dynamic storage device 320 (referred to as memory), coupled to bus 305 and may store information and instructions that may be executed by processor 310. Memory 320 may also be used to store temporary variables or other intermediate information during execution of instructions by processor 310. In one embodiment, processor(s) 310 may include both a processor core and a memory controller. In alternate embodiments, the processor core(s) and memory controller may be part of different components.

Memory 320 includes a memory system that may be adaptively controlled to function as described above with various operational parameters based on system conditions and/or policies. System conditions may be monitored by processor 310 and/or a memory controller. The memory controller may be part of processor 310, memory 320, or another system component.

Electronic system 300 may also include read only memory (ROM) and/or other static storage device 330 coupled to bus 305 that may store static information and instructions for processor 310. Data storage device 340 may be coupled to bus 305 to store information and instructions. Data storage device 340 such as a magnetic disk or optical disc and corresponding drive may be coupled to electronic system 300.

Electronic system 300 may also be coupled via bus 305 to display device 350, such as a cathode ray tube (CRT) or liquid crystal display (LCD), to display information to a user. Alphanumeric input device 360, including alphanumeric and other keys, may be coupled to bus 305 to communicate information and command selections to processor 310. Another type of user input device is cursor control 370, such as a mouse, a trackball, or cursor direction keys to communicate direction information and command selections to processor 310 and to control cursor movement on display 350.

Electronic system 300 further may include network interface(s) 380 to provide access to a network, such as a local area network. Network interface(s) 380 may include, for example, a wireless network interface having antenna 385, which may represent one or more antenna(e). Network interface(s) 380 may also include, for example, a wired network interface to communicate with remote devices via network cable 387, which may be, for example, an Ethernet cable, a coaxial cable, a fiber optic cable, a serial cable, or a parallel cable.

In one embodiment, network interface(s) 380 may provide access to a local area network, for example, by conforming to IEEE 802.11b and/or IEEE 802.11g standards, and/or the wireless network interface may provide access to a personal area network, for example, by conforming to Bluetooth standards. Other wireless network interfaces and/or protocols can also be supported.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents. Bluetooth protocols are described in "Specification of the Bluetooth System: Core, Version 1.1," published Feb. 22, 2001 by the Bluetooth Special Interest Group, Inc. Associated as well as previous or subsequent versions of the Bluetooth standard may also be supported.

In addition to, or instead of, communication via wireless LAN standards, network interface(s) 380 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

Figure 4:
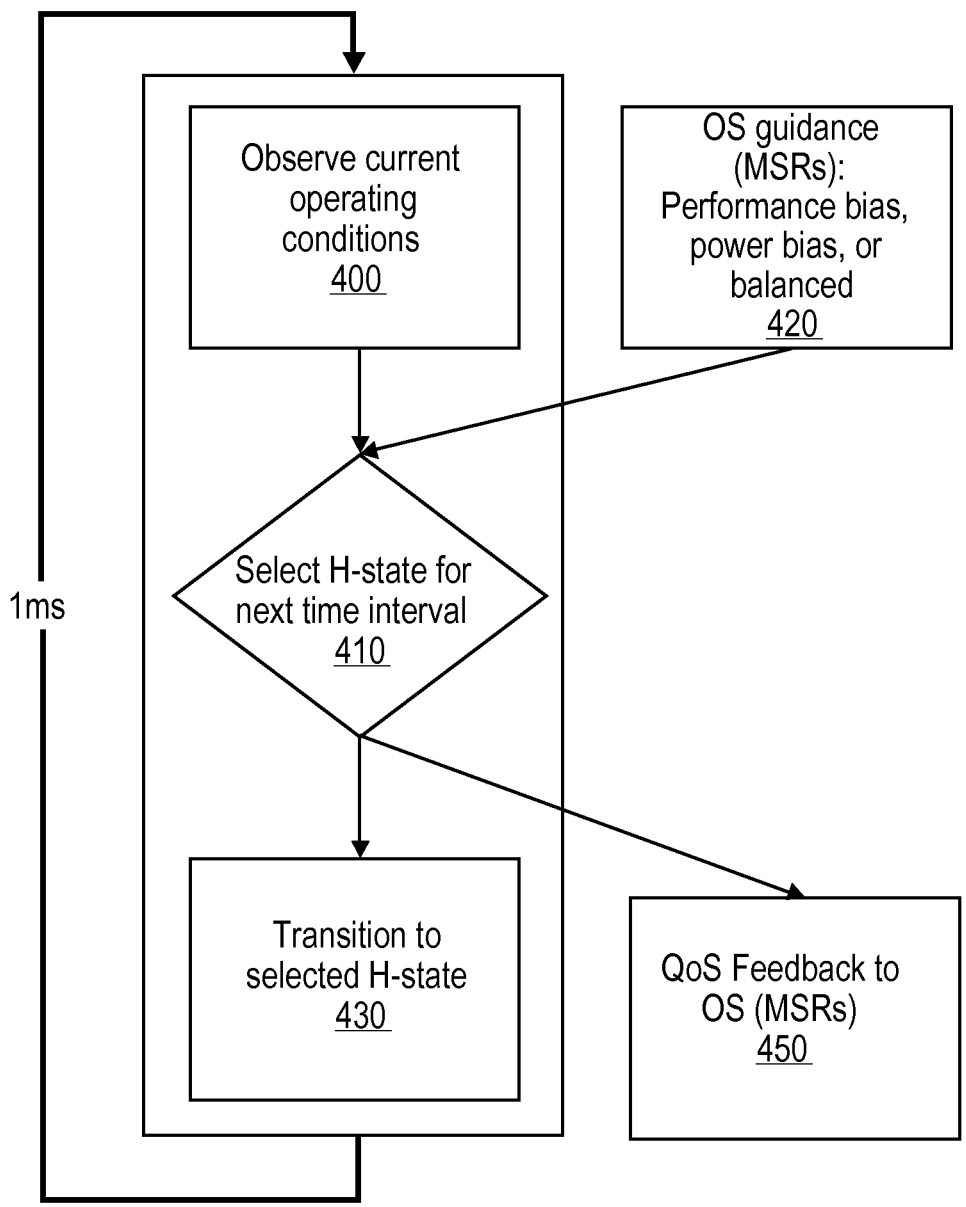
FIG. 4 is a flow diagram of one embodiment of a technique for dynamic selection and modification of memory operational states.

FIG. 4 is a flow diagram of one embodiment of a technique for dynamic selection and modification of memory operational states. The flow diagram of FIG. 4 includes optional operating system involvement. Some embodiments include operating system involvement, and other embodiments can operate without operating system involvement. Thus, the operating system components of FIG. 4 are optional.

Current operating conditions are observed, 400. These operating conditions may include one or more of the conditions described above, for example, memory bandwidth utilization, current memory operating state, memory scaling factor, etc.

The current operating conditions are utilized to select a next operational state for the memory system, 410. Selection of the next operational state for the memory may also include operating system guidance, 420. The operating system guidance may include, for example, performance bias values, power bias values, and/or other policy information.

In one embodiment, the next operational state is selected from one of four operational states, for example, as described with respect to FIG. 1. In alternate embodiments, a different number of operational states for the memory system may be supported.

The memory system transitions to the new operational state, 430. Under some conditions the new operational state may be the same as the old operational state, for example, if the monitored conditions have not significantly changed. The cycle then repeats. In one embodiment the operational state is updated/changed approximately every 1 ms; however, other periods can be used.

In one embodiment, after selection of the operational state, information related to the selection of the new operational state is provided to the operating system. In one embodiment, this is referred to as quality of service (QoS) feedback to the operating system, 450.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A system comprising:
a processing core to execute an application;
a memory sub-system; and
a memory controller coupled with the processing core and the memory sub-system, the memory controller to monitor operation of the memory sub-system, to compare the monitored operation to one or more one or more performance thresholds, and to modify operating voltage and operating frequency parameters for the memory sub-system based on at least monitored performance characteristics of the memory sub-system and operating system guidance utilizing a memory scaling factor that dynamically captures workload sensitivity to memory latency and guides memory sub-system state transition decisions.

2. The system of claim 1 wherein the memory controller further modifies a memory powerdown policy and a memory prefetch policy based on at least monitored performance characteristics of the memory sub-system.

3. The system of claim 1 wherein the memory controller further modifies the operating voltage and/or the operating frequency parameters for the memory sub-system based at least on a detected latency sensitivity of the application.

4. The system of claim 1 wherein the memory controller further modifies a pre-fetch policy based at least on the monitored performance characteristics of the memory sub-system.

5. The system of claim 1 wherein the memory controller and the memory sub-system interoperate to cause the memory sub-system to operate in one of four operational states as defined by the operating voltage and the operating frequency parameters.

6. The system of claim 1 wherein the processing core further executes an operating system, the operating system to provide feedback to be utilized by the memory controller to modify the operating voltage and/or the operating frequency parameters for the memory sub-system.

7. The system of claim 6 wherein the operating system feedback comprises at least modifying the one or more one or more performance thresholds.

8. The system of claim 1 wherein the monitored performance characteristics of the memory sub-system comprise at least an amount of time the processing core is stalled by memory sub-system latency.

9. The system of claim 1 wherein the monitored performance characteristics of the memory sub-system comprise at least memory sub-system bandwidth utilization.

10. A method comprising:
monitoring operating characteristics of a memory sub-system within an electronic device;
comparing the monitored operating characteristics of the memory sub-system with a plurality of performance threshold values; and
modifying operating voltage and operating frequency of the memory sub-system based at least on the comparison of the monitored operating characteristics and the plurality of thresholds and operating system guidance utilizing a memory scaling factor that dynamically captures workload sensitivity to memory latency and guides memory sub-system state transition decisions.

11. The method of claim 10 further comprising modifying a memory powerdown policy and a memory prefetch policy based on at least monitored performance characteristics of the memory sub-system.

12. The method of claim 10 wherein modifying the operating voltage and the operating frequency parameters for the memory sub-system is based at least on a detected latency sensitivity of the application.

13. The method of claim 10 wherein further comprising modifying a pre-fetch policy based at least on the monitored performance characteristics of the memory sub-system.

14. The method of claim 10 wherein a memory controller and a memory sub-system interoperate to cause the memory sub-system to operate in one of at least four operational states as defined by the operating voltage and the operating frequency parameters.

15. The method of claim 10 further comprising executing an operating system, the operating system to provide feedback to be utilized by the memory controller to modify the operating voltage and/or the operating frequency parameters for the memory sub-system.

16. The method of claim 15 wherein the operating system feedback comprises at least modifying the one or more one or more performance thresholds.

17. The method of claim 10 wherein the monitored performance characteristics of the memory sub-system comprise at least an amount of time the processing core is stalled by memory sub-system latency.

18. The method of claim 10 wherein the monitored performance characteristics of the memory sub-system comprise at least memory sub-system bandwidth utilization.

19. An apparatus comprising:
an interface to communicate with a memory sub-system;
performance threshold storage to store one or more performance threshold values; and
memory controller circuitry coupled with the interface and the performance threshold storage, the memory controller circuitry to monitor operation of the memory sub-system, to compare the monitored operation to the one or more one or more performance threshold values, and to modify operating voltage and operating frequency parameters for the memory sub-system based on at least monitored performance characteristics of the memory sub-system and operating system guidance utilizing a memory scaling factor that dynamically captures workload sensitivity to memory latency and guides memory sub-system state transition decisions.

20. The apparatus of claim 19 wherein the memory controller further modifies a memory powerdown policy and a memory prefetch policy based on at least monitored performance characteristics of the memory sub-system.

21. The apparatus of claim 19 wherein the memory controller circuitry further modifies the operating voltage and/or the operating frequency parameters for the memory sub-system based at least on a detected latency sensitivity of the application.

22. The apparatus of claim 19 wherein the memory controller circuitry further modifies a pre-fetch policy based at least on the monitored performance characteristics of the memory sub-system.

23. The apparatus of claim 19 wherein the memory controller circuitry and the memory sub-system interoperate to cause the memory sub-system to operate in one of four operational states as defined by the operating voltage and the operating frequency parameters.

24. The apparatus of claim 19 wherein the monitored performance characteristics of the memory sub-system comprise at least an amount of time the processing core is stalled by memory sub-system latency.

25. The apparatus of claim 19 wherein the monitored performance characteristics of the memory sub-system comprise at least memory sub-system bandwidth utilization.

26. A method comprising:
monitoring a memory scaling factor (MSF) for one or more processing cores, aggregate channel bandwidth from a memory controller, and operating system performance versus power bias in a host system;
comparing the MSF, aggregate channel bandwidth and operating system performance versus power bias with a plurality of performance threshold values; and
modifying one or more of memory operating frequency, memory operating voltage, powerdown policy, and prefetching policy of a memory sub-system of the host system based at least on the comparison of the MSF, aggregate channel bandwidth and operating system performance versus power bias with a plurality of performance threshold values and operating system guidance utilizing a memory scaling factor that dynamically captures workload sensitivity to memory latency and guides memory sub-system state transition decisions.

* * * * *